(12) United States Patent
Wang et al.

(10) Patent No.: US 12,339,919 B2
(45) Date of Patent: Jun. 24, 2025

(54) METHOD OF PROCESSING TRIPLE DATA, METHOD OF TRAINING TRIPLE DATA PROCESSING MODEL, DEVICE, AND MEDIUM

(71) Applicant: Beijing Baidu Netcom Science Technology Co., Ltd., Beijing (CN)

(72) Inventors: Zhaoji Wang, Beijing (CN); Fang Huang, Beijing (CN); Ye Jiang, Beijing (CN); Yabing Shi, Beijing (CN); Chunguang Chai, Beijing (CN); Yong Zhu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 122 days.

(21) Appl. No.: 17/934,876

(22) Filed: Sep. 23, 2022

(65) Prior Publication Data

US 2023/0016403 A1   Jan. 19, 2023

(30) Foreign Application Priority Data

Sep. 23, 2021 (CN) .......................... 202111118746.9

(51) Int. Cl.
*G06F 16/00* (2019.01)
*G06F 16/9537* (2019.01)
*G06F 40/226* (2020.01)
*G06F 40/30* (2020.01)

(52) U.S. Cl.
CPC ........ *G06F 16/9537* (2019.01); *G06F 40/226* (2020.01); *G06F 40/30* (2020.01)

(58) Field of Classification Search
CPC ..... G06F 16/9537; G06F 40/30; G06F 40/226
See application file for complete search history.

(56) References Cited

U.S. PATENT DOCUMENTS

| | | | |
|---|---|---|---|
| 10,303,790 B2 * | 5/2019 | Bishop | G06F 16/90332 |
| 10,614,913 B2 * | 4/2020 | Sethumadhavan | G06F 18/24 |
| 10,915,577 B2 * | 2/2021 | Srinivasan | G06F 16/36 |
| 11,068,439 B2 * | 7/2021 | Bicer | G06F 16/116 |

(Continued)

FOREIGN PATENT DOCUMENTS

| | | |
|---|---|---|
| CN | 110297868 | 10/2019 |
| CN | 110515999 | 11/2019 |

(Continued)

OTHER PUBLICATIONS

Chinese First Office Action, issued in the corresponding Chinese patent application No. 202111118746.9, dated May 27, 2022, 22 pages.

(Continued)

*Primary Examiner* — Leslie Wong
(74) *Attorney, Agent, or Firm* — HSML P.C.

(57) ABSTRACT

The present disclosure provides a method of processing triple data, a method of training a triple data processing model, an electronic device, and a storage medium. A specific implementation solution includes: performing a triple data extraction on text data to obtain a plurality of field data; normalizing the plurality of field data to determine target triple data, wherein the target triple data contains entity data, entity relationship data, and association entity data; and verifying a confidence level of the target triple data to obtain a verification result.

13 Claims, 7 Drawing Sheets

(56) References Cited

U.S. PATENT DOCUMENTS

| | | | |
|---|---|---|---|
| 11,880,397 B2* | 1/2024 | Li | G06F 40/279 |
| 11,922,327 B2* | 3/2024 | Seyot | G06F 40/30 |
| 2013/0124525 A1* | 5/2013 | Anderson | G06F 16/278 |
| | | | 707/737 |
| 2013/0226846 A1* | 8/2013 | Li | G06N 20/00 |
| | | | 706/12 |
| 2017/0286489 A1* | 10/2017 | Dantressangle | G06F 16/2455 |
| 2018/0053114 A1* | 2/2018 | Adjaoute | G06N 20/00 |
| 2019/0236492 A1* | 8/2019 | Saha | G06F 40/295 |
| 2020/0320130 A1* | 10/2020 | Korpman | G06F 16/9577 |
| 2021/0081463 A1* | 3/2021 | Walker | G06F 16/958 |
| 2021/0342549 A1 | 11/2021 | Liu et al. | |

FOREIGN PATENT DOCUMENTS

| | | | | |
|---|---|---|---|---|
| CN | 110619053 | | 12/2019 | |
| CN | 112507125 A | * | 12/2020 | G06F 16/367 |
| CN | 112560496 | | 3/2021 | |
| CN | 112800184 | | 5/2021 | |
| CN | 112836064 | | 5/2021 | |
| CN | 113011189 | | 6/2021 | |
| CN | 113111135 | | 7/2021 | |

OTHER PUBLICATIONS

She Heng, "Research and Implementation of Chinese Text Entity Relation Extraction Based on Deep Learning", Beijing University of Posts and Telecommunications, School of Computer Science, May 24, 2019, 79 pages (including English abstract).

Extended European Search Report, issued in the corresponding European Patent Application No. 22197384.5, dated Jan. 26, 2023, 8 pages.

* cited by examiner

METHOD OF PROCESSING TRIPLE DATA, METHOD OF TRAINING TRIPLE DATA PROCESSING MODEL, DEVICE, AND MEDIUM

CROSS-REFERENCE TO RELATED APPLICATION(S)

This application claims the priority of Chinese Patent Application No. 202111118746.9, filed on Sep. 23, 2021, the entire contents of which are hereby incorporated by reference.

TECHNICAL FIELD

The present disclosure relates to a field of a data processing technology, in particular to a field of an artificial intelligence technology such as big data and deep learning, and specifically relates to a method and an apparatus of processing triple data, a method of training a triple data processing model, an electronic device, a storage medium, and a program product.

BACKGROUND

With a rapid development of the Internet, an application of Internet big data has penetrated into various fields and industries, and has become an important factor of production. Internet big data has characteristics of massive data scale, diverse data types, and rapid data flow. A diversity of data sources of Internet big data makes it difficult to guarantee an accuracy and a timeliness of Internet big data, resulting in inconvenience in use.

SUMMARY

The present disclosure provides a method of processing triple data, a method of training a triple data processing model, an electronic device, and a storage medium.

According to an aspect of the present disclosure, a method of processing triple data is provided, including: performing a triple data extraction on text data to obtain a plurality of field data; normalizing the plurality of field data to determine target triple data, wherein the target triple data contains entity data, entity relationship data, and association entity data; and verifying a confidence level of the target triple data to obtain a verification result.

According to another aspect of the present disclosure, a method of training a triple data processing model is provided, including: performing a triple data extraction on text training data to obtain a plurality of training field data; normalizing the plurality of training field data to determine target training triple data, wherein the target training triple data contains training entity data, training entity relationship data, and training association entity data; and training the triple data processing model by using the target training triple data and a label for the target training triple data, so as to obtain a trained triple data processing model, wherein the label indicates a confidence level of the target training triple data.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method described above.

According to another aspect of the present disclosure, a non-transitory computer-readable storage medium having computer instructions therein is provided, wherein the computer instructions are configured to cause a computer to implement the method described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure.

DETAILED DESCRIPTION OF EMBODIMENTS

Figure 1:
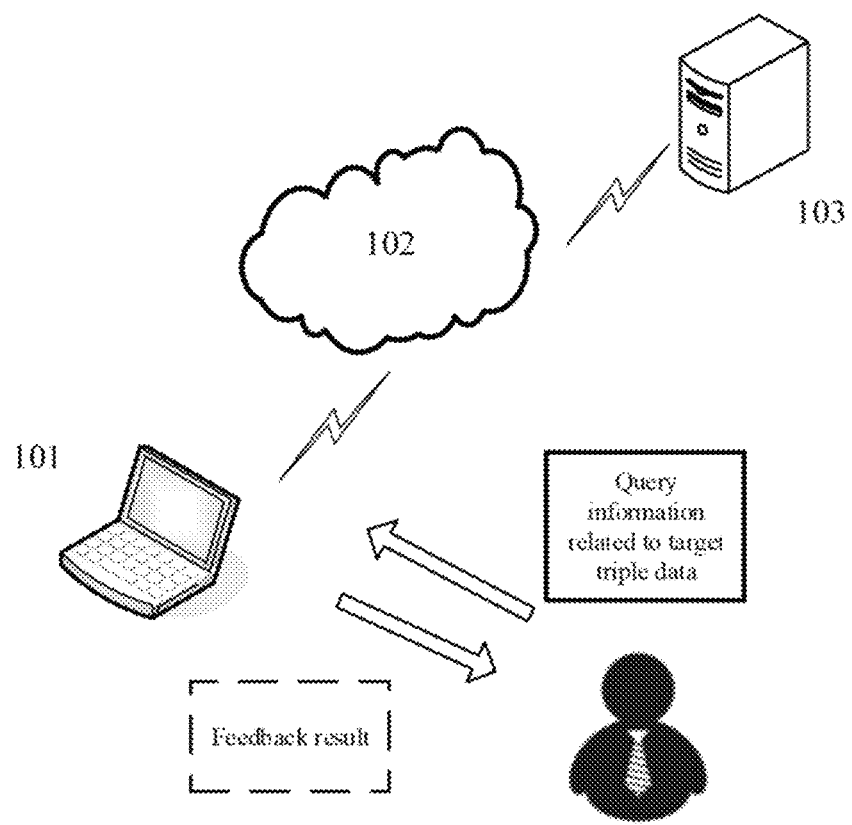
FIG. 1 schematically shows an exemplary application scenario in which a method and an apparatus of processing triple data may be applied according to embodiments of the present disclosure.

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In real life, for example, a user may query a specific location and business hours of a hotel through the Internet, so as to plan a dinner time and travel route. In another example, a user may inquire about a teacher level of a university through the Internet, so as to evaluate a teaching quality of the university.

The present disclosure provides a method and an apparatus of processing triple data, a method and an apparatus of training a triple data processing model, an electronic device, a storage medium, and a program product.

According to embodiments of the present disclosure, the method of processing the triple data may include: performing a triple data extraction on text data to obtain a plurality of field data; normalizing the plurality of field data to determine target triple data containing entity data, entity relationship data and association entity data; and verifying a confidence level of the target triple data to obtain a verification result.

By using the method of processing the triple data provided in embodiments of the present disclosure, the extraction and the normalization may be performed more pertinently on the text data to obtain the target triple data, which is conducive to simplifying a subsequent verification of the confidence level and improving an accuracy of the verification of the confidence level. After the verification of the confidence level, a decision may be made on an application of the text data related to the target triple data according to a verification result, and the text data related to the target triple data with a low confidence level may be filtered out, so that a reliability and an accuracy of the text data related to the target triple data may be improved. As the present disclosure may not rely on an authoritative data source and may be implemented to verify the confidence level of the text data related to the target triple data from a non-authoritative data source, a richness and a coverage of the text data related to the target triple data may be expanded on the premise of ensuring the accuracy of the text data related to the target triple data.

For example, when the location and business hours of the hotel are changed, or when a teacher of the university has retired, unchanged invalid data may be verified to ensure the accuracy and reliability of the text data related to the corresponding target triple data published on the Internet, so as to improve a user experience.

According to embodiments of the present disclosure, the method of training the triple data processing model may include: performing a triple data extraction on text training data to obtain a plurality of training field data; normalizing the plurality of training field data to determine target training triple data containing training entity data, training entity relationship data and training association entity data; and training the triple data processing model by using the target training triple data and a label for the target training triple data, so as to obtain a trained triple data processing model. The label indicates a confidence level of the target training triple data.

In the technical solution of the present disclosure, an acquisition, a storage, an application, a processing, a transmission, a provision and a disclosure of user personal information involved comply with provisions of relevant laws and regulations, and do not violate public order and good custom.

FIG. 1 schematically shows an exemplary application scenario in which a method and an apparatus of processing triple data may be applied according to embodiments of the present disclosure.

It should be noted that FIG. 1 is only an example of an application scenario to which embodiments of the present disclosure may be applied to help those skilled in the art understand the technical content of the present disclosure, but it does not mean that embodiments of the present disclosure may not be applied to other devices, systems, environments or scenarios. For example, in other embodiments, an exemplary system architecture in which the method and the apparatus of processing the triple data may be applied may include a terminal device, but the terminal device may implement the method and the apparatus of processing the triple data provided in embodiments of the present disclosure without interacting with a server.

As shown in FIG. 1, an application scenario according to such embodiments may include terminal device 101, a network 102, and a server 103. The network 102 is used to provide a medium for a communication link between the terminal device 101 and the server 103. The network 102 may include various connection types, such as wired or wireless communication links, etc.

A user may use the terminal device 101 to interact with the server 103 via the network 102, so as to transmit a query information related to a target triple data and receive a feedback result for the query information, etc. Various communication client applications may be installed on the terminal device 101, such as knowledge reading applications, web browser applications, search applications, instant messaging tools, mailbox clients and/or social platform software, etc. (for example only).

The terminal device 101 may be various electronic devices having display screens and supporting web browsing, including but not limited to smartphones, tablet computers, laptop computers, desktop computers, etc.

The server 103 may be a server that provides various services, such as a background management server that provides a support for a content browsed by the user using the terminal device 101 (for example only). For example, the background management server may analyze a received query information related to the target triple data input by the user, perform a triple data verification on a text data related to the target triple data, and feed back the text data with a confidence level greater than a predetermined confidence threshold as a feedback result to the terminal device.

It should be noted that the method of processing the triple data provided by embodiments of the present disclosure may generally be performed by the server 103. Accordingly, the apparatus of verifying the triple data provided by embodiments of the present disclosure may be generally provided in the server 103. The method of processing the triple data provided by embodiments of the present disclosure may also be performed by a server or server cluster different from the server 103 and capable of communicating with the terminal device 101 and/or the server 103. Accordingly, the apparatus of verifying the triple data provided by embodiments of the present disclosure may also be provided in a server or server cluster different from the server 103 and capable of communicating with the terminal device 101 and/or the server 103.

It should be understood that the number of terminal devices, network and server in FIG. 1 is only schematic. According to implementation needs, any number of terminal device, network and server may be provided.

Figure 2:
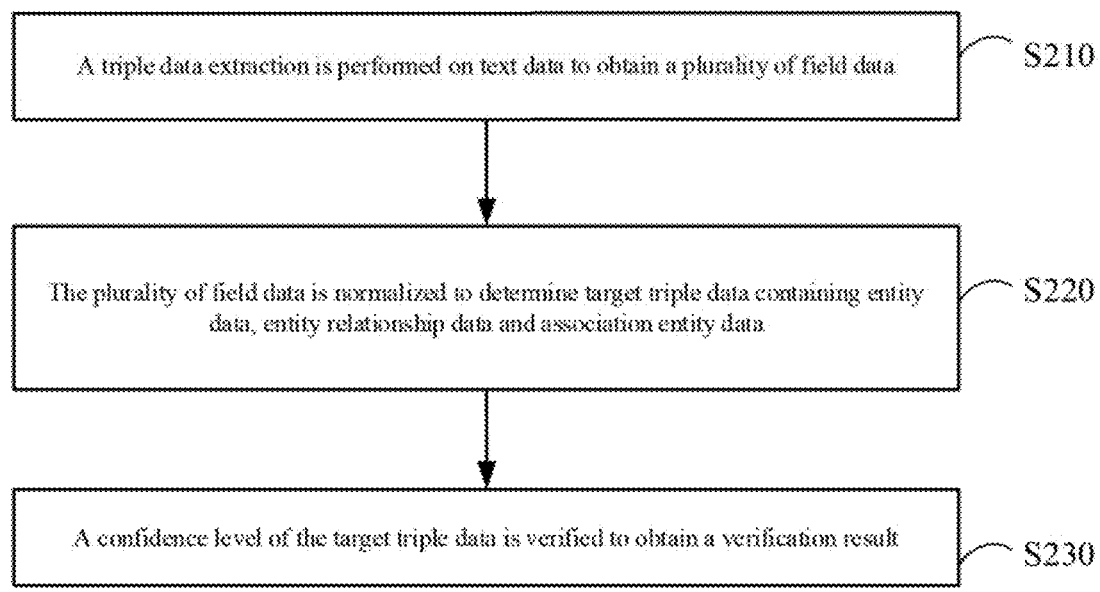
FIG. 2 schematically shows a flowchart of a method of processing triple data according to embodiments of the present disclosure.

FIG. 2 schematically shows a flowchart of a method of processing triple data according to embodiments of the present disclosure.

As shown in FIG. 2, the method includes operations S210 to S230.

In operation S210, a triple data extraction is performed on text data to obtain a plurality of field data.

In operation S220, the plurality of field data is normalized to determine target triple data containing entity data, entity relationship data and association entity data.

In operation S230, a confidence level of the target triple data is verified to obtain a verification result.

According to embodiments of the present disclosure, a source of the text data is not limited. For example, the text data may be obtained from the Internet or from a database, as long as the text data contains triple data.

According to embodiments of the present disclosure, the target triple data may be SPO (Subject, Predicate. Object) target triple data. In an example, the target triple data may contain entity (Subject) data, entity relationship (Predicate) data, and association entity (Object) data. The entity data and the association entity data may refer to meaningful things, and some relationships between the entity data and the association entity data may be referred as the entity relationship data.

For example, the entity data may be a name of a person, such as AA. The association entity data may be a job title corresponding to the entity data, such as a schoolmaster, a manager, etc. The entity relationship data may be a current state corresponding to the entity data, such as serving or resigning. The entity data may also refer to a name of things, such as BB restaurant or CC hotel. The association entity data may be business hours or a geographical location corresponding to the entity data. The entity relationship data may be a current state corresponding to the entity data, such as changing or not.

According to embodiments of the present disclosure, a plurality of field data may be obtained after the triple data extraction is performed on the text data. A number of words in the plurality of field data is not limited, as long as each field data of the plurality of field data only contains field data of one data type. For example, one field data may contain data corresponding to the entity data.

According to embodiments of the present disclosure, normalizing the plurality of field data refers to normalizing a plurality of field data of a target type to obtain one field data of the target type. For example, one text data may contain a plurality of same or similar field data. The plurality of field data obtained after performing the triple data extraction on the text data may include a plurality of field data of the same target type. By the normalization, the same or similar field data may be integrated to obtain the target triple data, which is conductive to simplifying a subsequent verification of a confidence level.

According to exemplary embodiments of the present disclosure, the plurality of field data may also include three field data, which may be directly used as the target triple data.

According to embodiments of the present disclosure, a confidence level of the target triple data may be verified to obtain a verification result, according to which an authenticity and accuracy of a content of the target triple data involved in the text data may be determined.

By using the method of processing the triple data provided in embodiments of the present disclosure, through the extraction and the normalization, the confidence level may be verified more pertinently, so that a range of data sources may be expanded. Moreover, by verifying the target triple data, the text data related to the target triple data with high accuracy and reliability may be recognized, and a data quality may be improved.

The method of processing the triple data provided in embodiments of the present disclosure will be further described below in combination with specific embodiments.

According to embodiments of the present disclosure, the operation S210 of performing the triple data extraction on the text data to obtain a plurality of field data may be performed by the following operations.

For example, the triple data extraction is performed on the text data to obtain a plurality of initial field data; initial field data of a target type is identified from the plurality of initial field data; candidate data is extracted from the text data responsive to the initial field data of the target type conforming to a predetermined rule; and the initial field data of the target type is modified according to the candidate data, so as to obtain the plurality of field data.

According to embodiments of the present disclosure, a regular extraction method may be used to perform the triple data extraction on the text data, but it is not limited to this. An extraction model may also be constructed and used to perform the triple data extraction on the text data. The extraction method is not specifically limited here.

According to embodiments of the present disclosure, the triple data extraction may be performed on the text data by using the regular extraction method, and a word segmentation and a parsing may be performed on an extraction result to obtain a plurality of initial field data.

According to embodiments of the present disclosure, the parsing may include identifying the initial field data of the target type from the plurality of initial field data, or may include matching the initial field data of the target type with the predetermined rule to determine whether the initial field data of the target type conforms to the predetermined rule.

According to embodiments of the present disclosure, the initial field data of the target type may be any one of data related to the entity data, data related to the entity relationship data, or data related to the association entity data.

According to exemplary embodiments of the present disclosure, the initial field data of the target type may be data related to the entity relationship data.

According to embodiments of the present disclosure, the predetermined rule may refer to that the initial field data of the target type contains partial empty initial field data. However, it is not limited to this. The predetermined rule may also refer to that the initial field data of the target type contains ambiguous initial field data.

For example, the initial field data of the target type may be "Schoolmaster of CY District Primary School", which does not contain field data introducing province and city to which CY District belongs. In China, city A has CY district, and city B also has CY district. Without a field of city following the CY District, it is difficult to determine whether the CY District Primary School is located in city A or city B, which conforms to the predetermine rule that the initial field data of the target type contains ambiguous initial field data. When the initial field data of the target type contains the ambiguous initial field data, candidate data may be extracted from the text data, and the initial field data of the target type may be modified according to the candidate data. For example, the initial field data related to an introduction of province and city may be extracted from the text data, and the acquired candidate data, such as city A, may be filled in front of the "CY District Primary School".

For example, the initial field data of the target type may be "President, Deputy Secretary of XX University". In the initial field data of the target type, the field data of "XX University" for unit and region follows "Deputy Secretary", but no initial field data for unit or region follows "President", then partial empty initial field data is contained, which conforms to the predetermined rule that the initial field data of the target type contains partial empty initial field data. Then, the initial field data related to an introduction of unit and region, such as XX University, may be extracted from the text data. The "XX University" may be added in front of the "President", so as to output a complete result "President of XX University, Deputy Secretary of XX University".

According to embodiments of the present disclosure, if the initial field data of the target type does not conform to the predetermined rule, it indicates that the initial field data of the target type is complete and unambiguous. In this case, the extracted plurality of initial field data may be directly output as a plurality of field data.

By the triple data extraction on the text data provided by embodiments of the present disclosure, an integrity of data may be improved, which is conducive to the accuracy of the subsequent verification of confidence level.

According to exemplary embodiments of the present disclosure, a validity of the plurality of initial field data may be further verified. The initial field data that conforms to a validity rule may be retained, and the initial field data that does not conform to the validity rule may be removed. For example, initial field data containing special symbols does not conform to the validity rule and may be removed directly.

By the triple data extraction on the text data provided by embodiments of the present disclosure, some invalid data may be removed, and a processing efficiency of subsequent operations may be improved.

According to embodiments of the present disclosure, operation S220 of normalizing the plurality of field data to determine the target triple data may be performed by the following operations.

For example, field data of a target type in the plurality of field data is clustered to determine a cluster, and field data in the cluster is sorted according to a number of words or a data source, and top field data is determined as a target field of the target type, so as to obtain the target triple data.

According to embodiments of the present disclosure, the normalization is also referred to as a disambiguation. In an example, it includes clustering and determining the target field of the target type.

According to embodiments of the present disclosure, the field data of the target type in the plurality of field data may be clustered by means of disjoint set union (for example, using an idea of connected component). For example, the data related to the entity data, the data related to the entity relationship data, and the data related to the association entity data may be respectively clustered to obtain a cluster of entity data, a cluster of entity relationship data, and a cluster of association entity data.

According to embodiments of the present disclosure, for each cluster, the field data may be sorted according to the number of words or the data source, and a central element of the cluster, that is, the target field of the target type, may be determined according to a sorting result.

For example, the field data may be sorted according to the number of words from most to least, and the top field data may be determined as the target field of the target type of the cluster.

For example, the field data may be sorted according to the data source from a highest source confidence level to a lowest source confidence level, and the top field data may be determined as the target field of the target type of the cluster. According to embodiments of the present disclosure, the source confidence level may be set according to actual situations.

By using the normalization provided by embodiments of the present disclosure, the plurality of field data may be normalized to one target triple data, which may simplify the processing operation of the subsequent verification of confidence level and improve the processing efficiency.

According to embodiments of the present disclosure, operation S230 of verifying the confidence level of the target triple data to obtain a verification result may be performed by the following operations.

For example, web data related to the target triple data is acquired according to the target triple data; target feature data is generated according to the web data; and the target feature data is input into a triple data processing model to obtain the verification result.

According to embodiments of the present disclosure, the target triple data may be used as a search term to search for the web data related to the target triple data.

According to embodiments of the present disclosure, the target feature data may be generated according to the web data. That is, the target feature data is generated using relevant data from other information sources.

By using the verification of confidence level provided by embodiments of the present disclosure, relevant data from more information sources may be acquired through the target triple data, and the verification of confidence level may be performed based on this, so that the basis source of the verification may be improved, and the accuracy of the verification of confidence level may be further improved.

According to embodiments of the present disclosure, the target feature data may include a temporal feature related to the web data, and/or an attribute feature related to the target triple data in the web data.

According to embodiments of the present disclosure, the temporal feature related to the web data may include a minimum-date-difference temporal feature and a maximum-date-difference temporal feature.

For example, the minimum-date-difference temporal feature may be a minimum value of date differences in the plurality of web data, that is, a date difference value corresponding to a minimum release time interval in the plurality of web data, or may be a minimum value of date differences in a plurality of web data in which target fields of a plurality of target types are concurrently displayed at a predetermined position.

For example, the maximum-date-difference temporal feature may be a maximum value of date differences in the plurality of web data, that is, a date difference value corresponding to a maximum release time interval in the plurality of web data, or may be a maximum value of date differences in a plurality of web data in which target fields of a plurality of target types are concurrently displayed at a predetermined position.

According to embodiments of the present disclosure, the attribute feature related to the target triple data in the web data may include an attribute feature of the target field of the target type. For example, the attribute feature of the target field of the target type may refer to a feature of whether the entity relationship data appears. It may also refer to an attribute feature of a semantic co-occurrence of the target fields of the target types, such as whether target fields of a plurality of target types appear in the web data, and whether the texts containing the target fields of the target types have the same semantics. If the same, it may be understood as the semantic co-occurrence of the target fields of the target types. The attribute feature of the semantic co-occurrence of the target fields of the target types may refer to a percentage of a plurality of web data with the semantic co-occurrence in the total web data, or may refer to a date difference in the plurality of web data with the semantic co-occurrence, or may refer to whether it is the semantic co-occurrence.

According to embodiments of the present disclosure, the predetermined position may be a position of a title information of the web data, a position of an abstract information of the web data, or a position of a main body in the web data, as long as it is a position related to the web data, which may be set according to actual situations.

According to embodiments of the present disclosure, a source of the web data may be verified, and the target feature data may be generated using only the web data from a reliable source. For example, web data of a predetermined website may be used as a reliable source. Therefore, a noise information in target feature data generated using web data from an unreliable source may be avoided, so as to avoid a decrease of an accuracy of a final verification result caused by the noise information.

According to embodiments of the present disclosure, the target feature data may reflect the target triple data from multiple dimensions and have a strong association. By using the target feature data provided by embodiments of the present disclosure, the accuracy of the verification of confidence level may be further improved.

Figure 3:
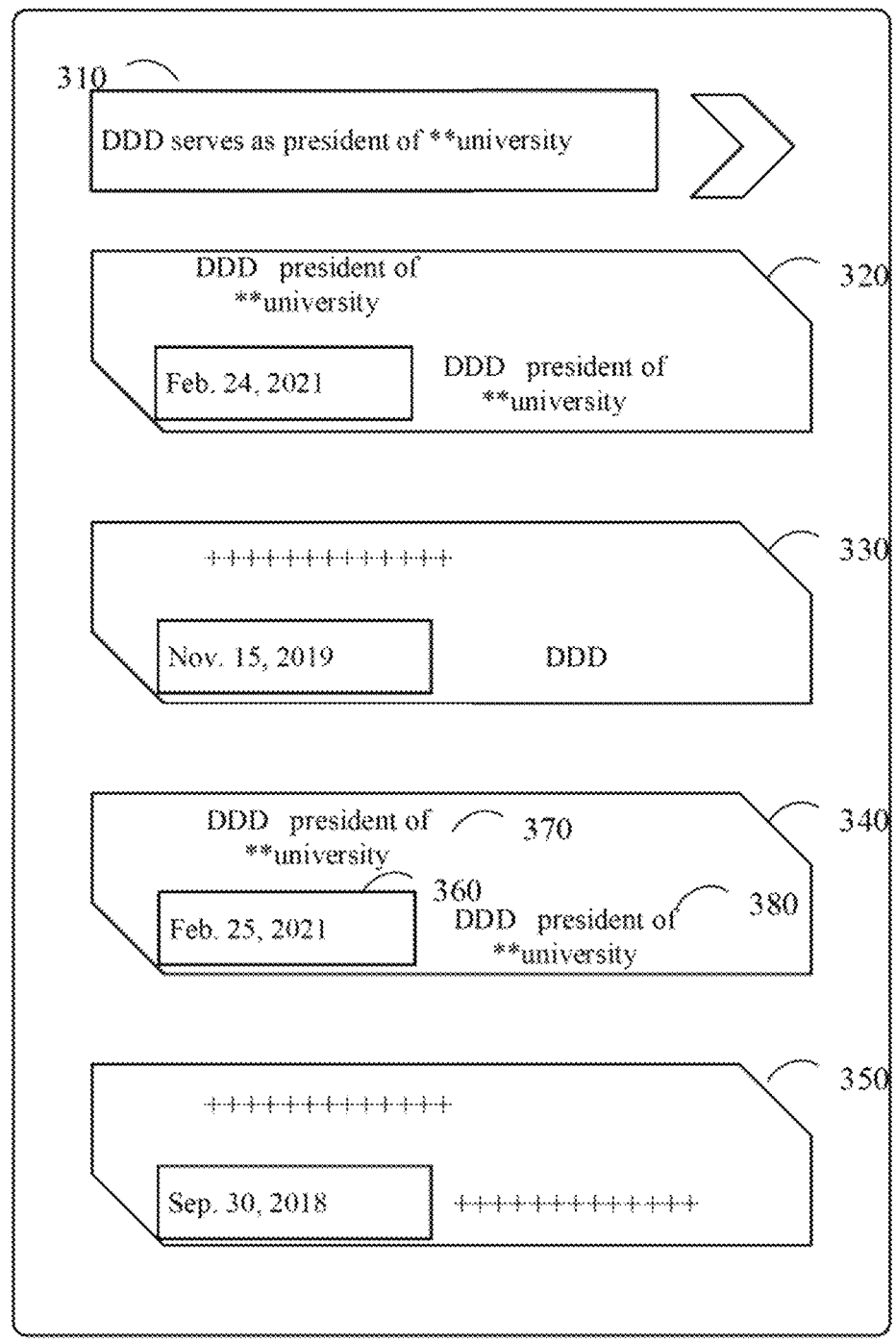
FIG. 3 schematically shows a schematic diagram of generating target feature data according to embodiments of the present disclosure.

FIG. 3 schematically shows a schematic diagram of generating target feature data according to other embodiments of the present disclosure.

As shown in FIG. 3, target triple data 310 may be used as a search term to search for web data related to the target triple data 310, and for example, web data 320, web data 330, web data 340, and web data 350 may be obtained.

The target feature data may be generated by various types of information in the web data 320, the web data 330, the web data 340, and the web data 350. For example, a triple data processing model may be used to predict whether the target triple data 310 is true, according to the target feature data.

For example, whether contents of "entity data: person name 'DDD'", "association entity data: President of ** University" and "entity relationship data: serving" in the target triple data 310 are true or not may be predicted.

When generating the target feature data by using the relevant information in the web data 320, the web data 330, the web data 340 and the web data 350, the target feature data may be generated by a time information 360, a title information 370, an abstract information 380, etc. in the web data.

For example, 12-dimensional target feature data may be constructed, including 4-dimensional minimum-date-difference temporal feature, 4-dimensional maximum-date-difference temporal feature, 1-dimensional entity relationship data feature, 3-dimensional entity data and association entity data co-occurrence feature.

For example, the 4-dimensional minimum-date-difference temporal feature may include: a minimum value of date differences in the web data 320, the web data 330, the web data 340 and the web data 350, a minimum value of date differences in the web data 320, the web data 330, the web data 340 and the web data 350 in which the "DDD" and the "President of  University" together appear in the title information 370 or the abstract information 380, a minimum value of date differences in the web data 320, the web data 330, the web data 340 and the web data 350 in which the "DDD" and the "President of  University" together appear in the title information 370, and a minimum value of date differences in the web data 320, the web data 330, the web data 340 and the web data 350 in which the "DDD" and the "President of ** University" together appear in the abstract information 380.

For example, the 4-dimensional maximum-date-difference temporal feature may include: a maximum value of date differences in the web data 320, the web data 330, the web data 340 and the web data 350, a maximum value of date differences in the web data 320, the web data 330, the web data 340 and the web data 350 in which the "DDD" and the "President of  University" together appear in the title information 370 or the abstract information 380, a maximum value of date differences in the web data 320, the web data 330, the web data 340 and the web data 350 in which the "DDD" and the "President of  University" together appear in the title information 370, and a maximum value of date differences in the web data 320, the web data 330, the web data 340 and the web data 350 in which the "DDD" and the "President of ** University" together appear in the abstract information 380.

For example, the 1-dimensional entity relationship data feature may include: whether the title information 370 or the abstract information 380 in the web data 320, the web data 330, the web data 340 and the web data 350 contains a feature of "resigning", "no longer holding", and other related contents.

For example, the 3-dimensional entity data and association entity data co-occurrence feature may include: a proportion of a number of web data in the web data 320, the web data 330, the web data 340 and the web data 350 in which the "DDD" and the "President of  University" concurrently appear to a total number of web data, a date difference in the web data 320, the web data 330, the web data 340 and the web data 350 with a semantic co-occurrence of the "DDD" and the "President of  University", and whether the "DDD" and the "President of  University" concurrently appear in the web data 320, the web data 330, the web data 340 and the web data 350. For example, if the "DDD" and the "President of  University" concurrently appear, it may be considered as a semantic co-occurrence.

Figure 4:
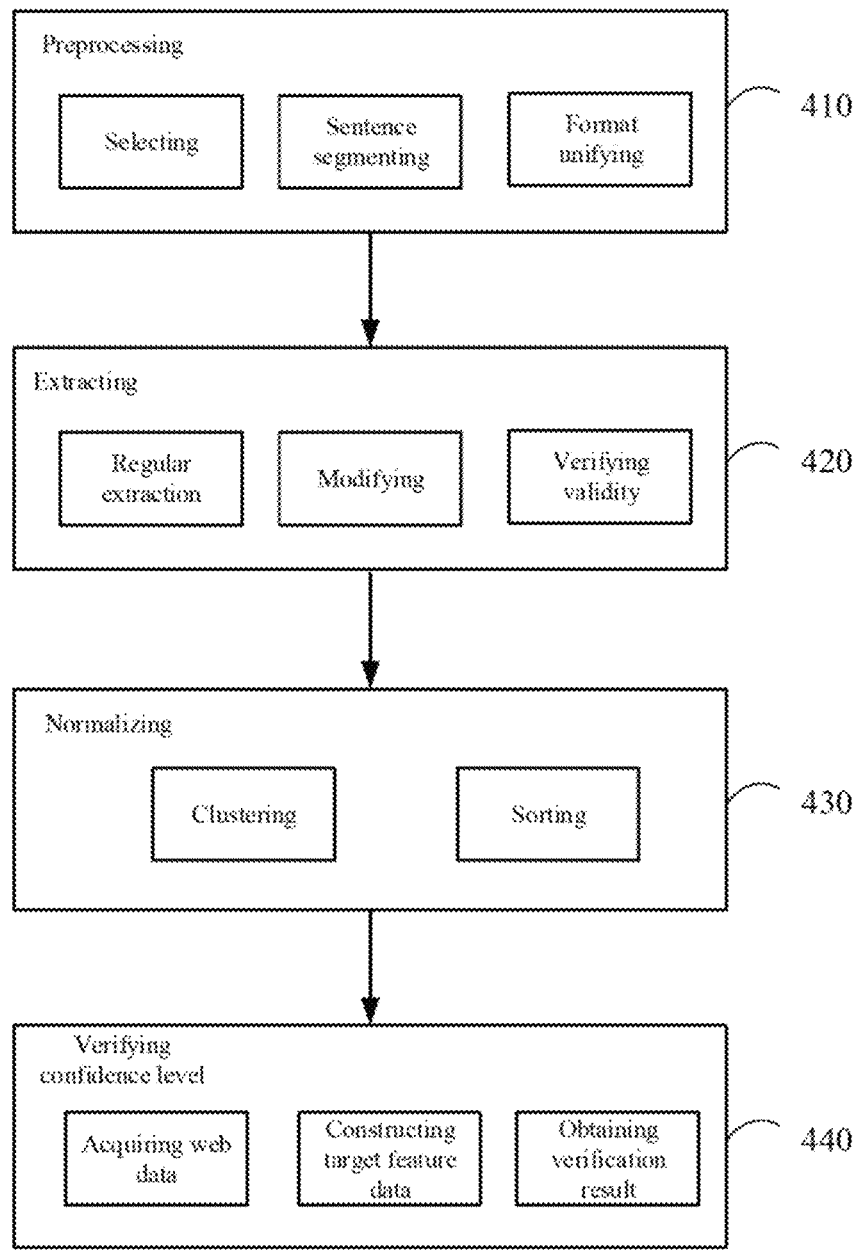
FIG. 4 schematically shows a flowchart of a method of processing triple data according to other embodiments of the present disclosure.

FIG. 4 schematically shows a flowchart of a method of processing triple data according to other embodiments of the present disclosure.

As shown in FIG. 4, the method includes operations S410 to S440.

In operation S410, initial text data is preprocessed to obtain text data at a sentence level.

According to embodiments of the present disclosure, specific operation processes of operations S420 to S440 shown in FIG. 4 may be the same as those of operations S210 to S230 shown in FIG. 2.

According to embodiments of the present disclosure, the preprocessing may include but not be limited to selecting, and the preprocessing may further include sentence segmenting and format unifying.

According to embodiments of the present disclosure, the initial text data may be selected according to a selection rule, and data unrelated to the triple data may be initially filtered out to improve a processing efficiency of a subsequent extraction.

According to embodiments of the present disclosure, a processing such as a sentence segmenting and a format unifying may be performed on the data obtained after the selecting. For example, the sentence segmenting may include segmenting text data at a paragraph level into text data at a single-sentence level. For example, the format unifying may include converting an upper case letter to a lower case letter, and converting tabular data in table form to text data in text form.

According to embodiments of the present disclosure, the initial text data is preprocessed to obtain the text data at sentence level, which may facilitate the subsequent extraction, simplify the process, and improve the extraction accuracy.

According to embodiments of the present disclosure, the verification result may be a value between 0 and 1. The verification result may be compared with a predetermined confidence threshold. When the verification result is greater than or equal to the predetermined confidence threshold, it indicates that the target triple data has a high confidence level and a high reliability. Then, original data related to the target triple data may be applied to fields such as question and answers, retrieval, etc.

When the verification result is less than the predetermined confidence threshold, it indicates that the target triple data has a low confidence level. Then, original data related to the target triple data may be modified or filtered out.

By using the method of processing the triple data provided in embodiments of the present disclosure, the preprocessing operation may be performed to process data in various formats and expand data sources. The extraction and normalization may be performed more pertinently on the preprocessed data to obtain the target triple data, which is conducive to simplifying the subsequent verification of confidence level and improving the accuracy of the verification of confidence level.

After the verification of confidence level, a decision may be made on an application of the original data related to the target triple data according to the verification result, and the original data related to the target triple data which has a confidence level lower than the predetermined confidence threshold may be filtered out, so as to improve the reliability and accuracy of the original data related to the target triple data. Therefore, the present disclosure may not rely on an authoritative data source, and may be implemented to verify the confidence level of the original data related to the target triple data from a non-authoritative data source, so that the richness and coverage of the original data related to the target triple data may be expanded on the premise of ensuring the accuracy of the original data related to the target triple data.

By using the method of processing the triple data provided in embodiments of the present disclosure, the original data related to the target triple data which corresponds to a verification result less than the predetermined confidence threshold may be modified or filtered out according to the verification result, so as to ensure the accuracy of the original data related to the triple data. Through a preliminary test, the accuracy may be improved to 99.7% by using the method according to embodiments of the present disclosure.

Figure 5:
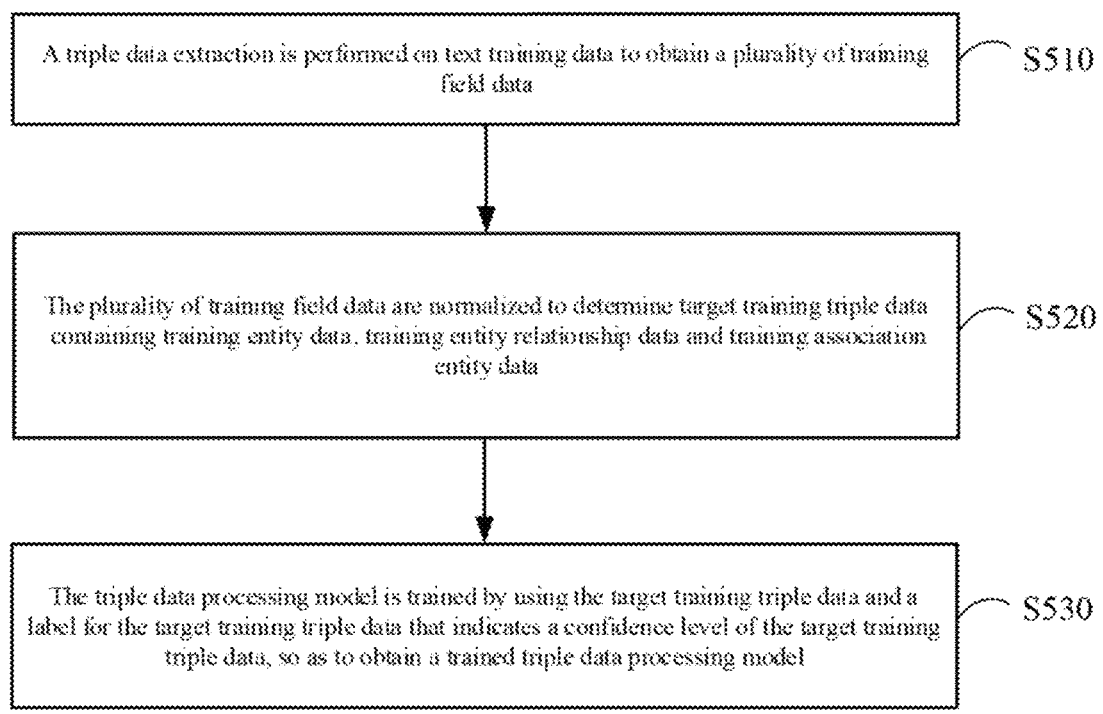
FIG. 5 schematically shows a flowchart of a method of training a triple data processing model according to embodiments of the present disclosure.

FIG. 5 schematically shows an example flowchart of a method of training a triple data processing model according to embodiments of the present disclosure.

As shown in FIG. 5, the method includes operations S510 to S530.

In operation S510, a triple data extraction is performed on text training data to obtain a plurality of training field data.

In operation S520, the plurality of training field data are normalized to determine target training triple data containing training entity data, training entity relationship data and training association entity data.

In operation S530, the triple data processing model is trained by using the target training triple data and a label for the target training triple data that indicates a confidence level of the target training triple data, so as to obtain a trained triple data processing model.

According to embodiments of the present disclosure, the target training triple data may be SPO (Subject. Predicate, Object) target training triple data. In an example, the target training triple data contains training entity (Subject) data, training entity relationship (Predicate) data, and training association entity (Object) data. The training entity data and the training association entity data may refer to meaningful things, and some relationships between the training entity data and the training association entity data may be referred as the training entity relationship data.

For example, the training entity data may be a name of a person, such as MM. The training association entity data may be a job title corresponding to the training entity data, such as a schoolmaster, a manager, etc. The training entity relationship data may be a current state corresponding to the training entity data, such as serving or resigning. The training entity data may also refer to a name of things, such as EE restaurant or FF hotel. The training association entity data may be business hours or a geographical location corresponding to the training entity data. The training entity relationship data may be a current state corresponding to the training entity data, such as changing or not.

According to embodiments of the present disclosure, operation S510 may be the same as the operation performed in operation S210. For example, a triple data extraction is performed on the text training data to obtain a plurality of initial training field data; initial training field data of a target type is identified from the plurality of initial training field data; candidate training data is extracted from the text training data responsive to the initial training field data of the target type conforming to a predetermined rule; and the initial training field data of the target type is modified according to the candidate training data to obtain a plurality of training field data. According to embodiments of the present disclosure, operation S520 may be the same as the operation performed in operation S220. For example, training field data of the target type in the plurality of training field data is clustered to determine a cluster; and the training field data in the cluster is sorted according to the number of words or the data source, and top training field data is determined as a target training field of the target type, so as to obtain the target training triple data. According to embodiments of the present disclosure, a label for the target training triple data indicates a confidence level of the target training triple data. For example, the label may be 1 if the target training triple data is true, and the label may be 0 if the target training triple data is false.

According to embodiments of the present disclosure, an architecture of the triple data processing model is not limited. For example, the triple data processing model may be a tree model, such as XGBoost, or may be a model of other network architectures, as long as the confidence level of the target training triple data may be verified to obtain the verification result.

By using the method of training the triple data processing model provided in embodiments of the present disclosure, the text training data may be preprocessed by using extraction and normalization, a range of the text training data of the triple data processing model may be expanded, the subsequent process of training the triple data processing model may be simplified, and the processing efficiency may be improved.

According to embodiments of the present disclosure, operation S530 of training the triple data processing model by using the target training triple data and the label for the target training triple data so as to obtain a trained triple data processing model may be performed by the following operations.

For example, sample web data related to the target training triple data is acquired according to the target training triple data; target training feature data is generated according to the sample web data, so as to train the triple data processing model by using the target training feature data and the label to obtain the trained triple data processing model. For example, the target training triple data may be used as a search term to search for a plurality of sample web data related to the target training triple data. The target training feature data may be generated by various types of information in the plurality of sample web data.

According to embodiments of the present disclosure, the target training feature data contains at least one selected from: a temporal feature related to the sample web data, or an attribute feature related to the target training triple data in the sample web data.

According to embodiments of the present disclosure, the temporal feature related to the sample web data may include a minimum-date-difference temporal feature and a maximum-date-difference temporal feature.

For example, the minimum-date-difference temporal feature may be a minimum value of date differences in the plurality of sample web data, that is, a date difference value corresponding to a minimum release time interval in the plurality of sample web data, or may be a minimum value of date differences in a plurality of sample web data in which target training fields of a plurality of target types are concurrently displayed at a predetermined position.

For example, the maximum-date-difference temporal feature may be a maximum value of date differences in the plurality of sample web data, that is, a date difference value corresponding to a maximum release time interval in the plurality of sample web data, or may be a maximum value of date differences in a plurality of sample web data in which target training fields of a plurality of target types are concurrently displayed at a predetermined position.

According to embodiments of the present disclosure, the attribute feature related to the target training triple data in the sample web data may include an attribute feature of the target training field of the target type. For example, the attribute feature of the target training field of the target type may refer to a feature of whether the entity relationship data appears. It may also refer to an attribute feature of a semantic co-occurrence of the target training fields of the target types, such as whether target training fields of a plurality of target types appear in the sample web data, and whether the texts containing the target training fields of the target types have the same semantics. If the same, it may be understood as the semantic co-occurrence of the target training fields of the target types. The attribute feature of the semantic co-occurrence of the target training fields of the target types may refer to a percentage of a plurality of sample web data with the semantic co-occurrence in the total web sample data, or may refer to a date difference in the plurality of sample web data with the semantic co-occurrence, or may refer to whether it is the semantic co-occurrence.

According to embodiments of the present disclosure, training the triple data processing model by using the target training feature data and the label so as to obtain a trained triple data processing model may be performed by the following operations.

For example, the target training feature data is input into the triple data processing model to obtain a verification result; the verification result and the label are input into a loss function to obtain a loss value; a parameter in the triple data processing model is adjusted according to the loss value until the loss value converges; and the triple data processing model obtained when the loss value converges is determined as the trained triple data processing model.

For example, the label may be 1 if the contents of "training entity data: person name 'XXX'", "association entity data: Schoolmaster of *** Primary School" and "entity relationship data: serving" in the target training triple data are true.

The target training triple data "Schoolmaster of *** Primary School XXX" may be used as a search term to search for a plurality of sample web data related to the target training triple data. The target training feature data is generated by various types of information in the plurality of sample web data. The target training feature data is input into the triple data processing model to obtain a verification result, which may be a value between 0 and 1. The verification result and the label of 1 are input into the loss function to obtain the loss value. The parameter in the triple data processing model is adjusted according to the loss value until the loss value converges. The triple data processing model obtained when the loss value converges is determined as the trained triple data processing model.

According to embodiments of the present disclosure, a type of the loss function is not limited, as long as it matches the training of the network architecture of the triple data processing model.

By using the target training feature data provided in embodiments of the present disclosure, it is possible to acquire relevant data from more information sources through the target training triple data, extract corresponding target training feature data from the relevant data, expand the dimension and range of the target training feature data, and further improve a convergence speed in the training of the triple data processing model.

The trained triple data processing model obtained by using the method of training the triple data processing model provided in embodiments of the present disclosure may be applied to the verification of the confidence level of the target triple data to achieve a high accuracy.

Figure 6:
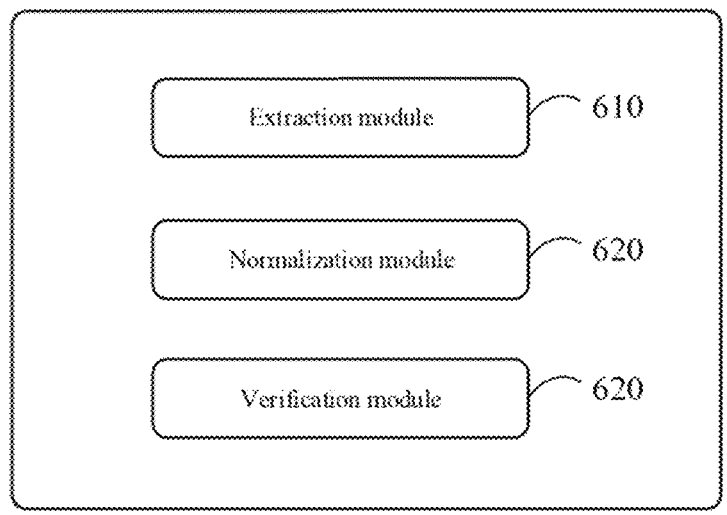
FIG. 6 schematically shows a block diagram of an apparatus of verifying triple data according to embodiments of the present disclosure.

FIG. 6 schematically shows a block diagram of an apparatus of verifying triple data according to embodiments of the present disclosure.

As shown in FIG. 6, an apparatus 600 of verifying triple data may include an extraction module 610, a normalization module 620, and a verification module 630.

The extraction module 610 is used to perform a triple data extraction on text data to obtain a plurality of field data.

The normalization module 620 is used to normalize the plurality of field data to determine target triple data containing entity data, entity relationship data and association entity data.

The verification module 630 is used to verify a confidence level of the target triple data to obtain a verification result.

According to embodiments of the present disclosure, the extraction module may include a first extraction unit, an identification unit, a second extraction unit, and a modification unit.

The first extracting unit is used to perform the triple data extraction on the text data to obtain a plurality of initial field data.

The identification unit is used to identify initial field data of a target type from the plurality of initial field data.

The second extraction unit is used to extract candidate data from the text data responsive to the initial field data of the target type conforming to a predetermined rule.

The modification unit is used to modify the initial field data of the target type according to the candidate data, so as to obtain the plurality of field data.

According to embodiments of the present disclosure, the normalization module may include a clustering unit and a sorting unit.

The clustering unit is used to cluster field data of a target type in the plurality of field data to determine a cluster.

The sorting unit is used to sort the field data in the cluster according to the number of words or the data source, and determine top field data as a target field of the target type, so as to obtain the target triple data.

According to embodiments of the present disclosure, the verification module may include an acquisition unit, a generation unit, and a verification unit.

The acquisition unit is used to acquire web data related to the target triple data according to the target triple data.

The generation unit is used to generate target feature data according to the web data.

The verification unit is used to input the target feature data into the triple data processing model to obtain a verification result.

According to embodiments of the present disclosure, the target feature data includes at least one selected from: a temporal feature related to the web data, or an attribute feature related to the target triple data in the web data.

According to embodiments of the present disclosure, the apparatus of verifying the triple data may further include a preprocessing module.

According to embodiments of the present disclosure, the preprocessing module is used to preprocess initial text data to obtain text data at a sentence level.

According to embodiments of the present disclosure, the preprocessing may include at least one selected from: selecting, sentence segmenting, or format unifying.

Figure 7:
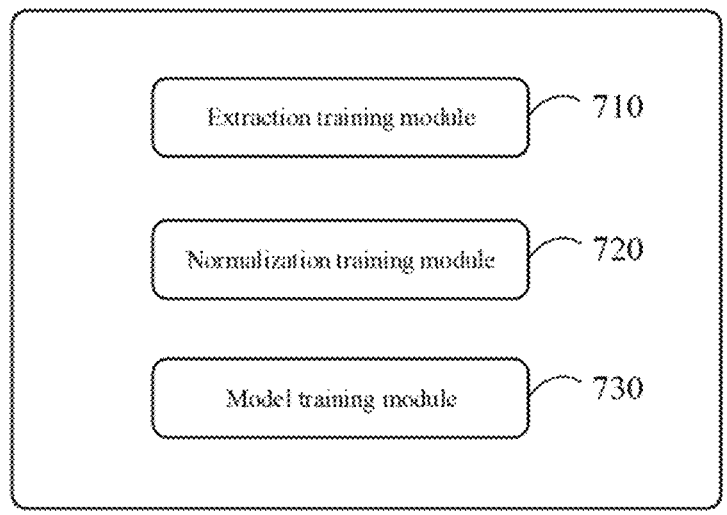
FIG. 7 schematically shows a block diagram of an apparatus of training a triple data processing model according to embodiments of the present disclosure.

FIG. 7 schematically shows a block diagram of an apparatus of training a triple data processing model according to embodiments of the present disclosure.

As shown in FIG. 7, an apparatus 700 of training a triple data processing model may include an extraction training module 710, a normalization training module 720, and a model training module 730.

The extraction training module 710 is used to perform a triple data extraction on text training data to obtain a plurality of training field data.

The normalization training module 720 is used to normalize the plurality of training field data to determine target training triple data containing training entity data, training entity relationship data and training association entity data.

The model training module 730 is used to train the triple data processing model by using the target training triple data and a label for the target training triple data that indicates a confidence level of the target training triple data, so as to obtain a trained triple data processing model.

According to embodiments of the present disclosure, the model training module may include an acquisition training unit and a generation training unit.

The acquisition training unit is used to acquire sample web data related to the target training triple data according to the target training triple data.

The generation training unit is used to generate target training feature data according to the sample web data, so as to train the triple data processing model by using the target training feature data and the label to obtain the trained triple data processing model.

According to embodiments of the present disclosure, the target training feature data includes at least one selected from: a temporal feature related to the sample web data, or an attribute feature related to the target training triple data in the sample web data.

According to embodiments of the present disclosure, the present disclosure further provides an electronic device, a readable storage medium, and a computer program product.

According to embodiments of the present disclosure, an electronic device is provided, including: at least one processor, and a memory communicatively connected to the at least one processor. The memory stores instructions executable by the at least one processor, and the instructions, when executed by the at least one processor, cause the at least one processor to implement the method described above.

According to embodiments of the present disclosure, a non-transitory computer-readable storage medium having computer instructions therein is provided, and the computer instructions are used to cause a computer to implement the method described above.

According to embodiments of the present disclosure, a computer program product containing a computer program is provided, and the computer program, when executed by a processor, causes the processor to implement the method described above.

Figure 8:
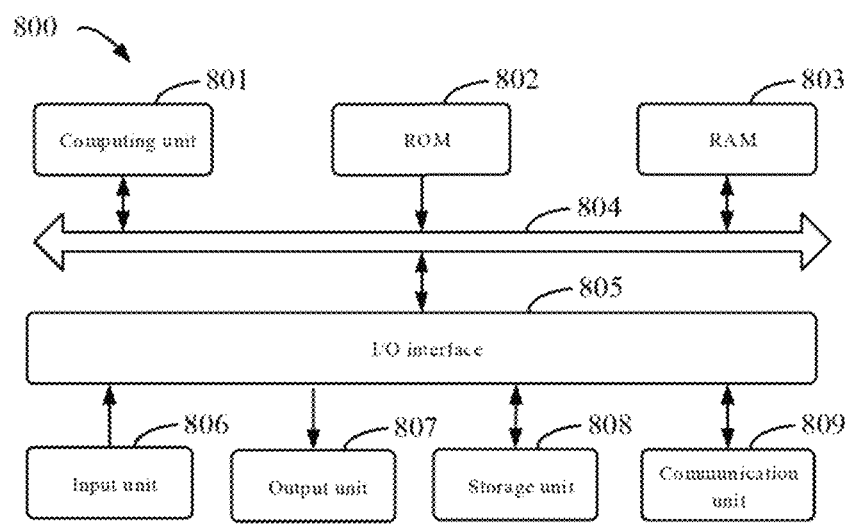
FIG. 8 schematically shows a block diagram of an electronic device suitable for implementing the method of processing the triple data according to embodiments of the present disclosure.

FIG. 8 shows a schematic block diagram of an exemplary electronic device 800 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 includes a computing unit 801 which may perform various appropriate actions and processes according to a computer program stored in a read only memory (ROM) 802 or a computer program loaded from a storage unit 808 into a random access memory (RAM) 803. In the RAM 803, various programs and data necessary for an operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, including: an input unit 806, such as a keyboard, or a mouse; an output unit 807, such as displays or speakers of various types; a storage unit 808, such as a disk, or an optical disc; and a communication unit 80), such as a network card, a modem, or a wireless communication transceiver. The communication unit 809 allows the electronic device 800 to exchange information/data with other devices through a computer network such as Internet and/or various telecommunication networks.

The computing unit 801 may be various general-purpose and/or dedicated processing assemblies having processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 801 executes various methods and processes described above, such as the method of processing the triple data or the method of training the triple data processing model. For example, in some embodiments, the method of processing the triple data or the method of training the triple data processing model may be implemented as a computer software program which is tangibly embodied in a machine-readable medium, such as the storage unit 808. In some embodiments, the computer program may be partially or entirely loaded and/or installed in the electronic device 800 via the ROM 802 and/or the communication unit 809. The computer program, when loaded in the RAM 803 and executed by the computing unit 801, may execute one or more steps in the method of processing the triple data or the method of training the triple data processing model described above. Alternatively, in other embodiments, the computing unit 801 may be used to perform the method of processing the triple data or the method of training the triple data processing model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing triple data, comprising:
    performing a triple data extraction on text data to obtain a plurality of field data;
    normalizing the plurality of field data to determine target triple data, wherein the target triple data contains entity data, entity relationship data, and association entity data; and
    verifying a confidence level of the target triple data to obtain a verification result,
    wherein the verifying the confidence level of the target triple data to obtain the verification result comprises:
    searching for web data related to the target triple data by using the target triple data as a search term;

generating target feature data according to the web data; and inputting the target feature data into a triple data processing model, so as to obtain the verification result, wherein the triple data processing model is obtained by training, and the training comprises:

performing a triple data extraction on text training data to obtain a plurality of training field data;

normalizing the plurality of training field data to determine target training triple data, wherein the target training triple data contains training entity data, training entity relationship data, and training association entity data; and training the triple data processing model by using the target training triple data and a label for the target training triple data, so as to obtain a trained triple data processing model, wherein the label indicates a confidence level of the target training triple data, wherein the training the triple data processing model by using the target training triple data and a label for the target training triple data, so as to obtain a trained triple data processing model, comprises:

searching for sample web data related to the target training triple data by using the target training triple data as a search term; and generating target training feature data according to the sample web data, so as to train the triple data processing model by using the target training feature data and the label to obtain the trained triple data processing model.

2. The method of claim 1, wherein the performing the triple data extraction on the text data to obtain the plurality of field data comprises:

performing the triple data extraction on the text data to obtain a plurality of initial field data;

identifying initial field data of a target type from the plurality of initial field data;

extracting candidate data from the text data responsive to the initial field data of the target type conforming to a predetermined rule; and modifying the initial field data of the target type according to the candidate data, so as to obtain the plurality of field data.

3. The method of claim 1, wherein the normalizing the plurality of field data to determine the target triple data comprises:

clustering field data of a target type in the plurality of field data, so as to determine a cluster; and sorting field data in the cluster according to a number of words or a data source, and determining top field data as a target field of the target type, so as to obtain the target triple data.

4. The method of claim 1, wherein the target feature data comprises at least one selected from: a temporal feature related to the web data, or an attribute feature related to the target triple data in the web data.

5. The method of claim 1, further comprising:

preprocessing initial text data to obtain the text data at a sentence level, wherein the preprocessing comprises at least one selected from: selecting, sentence segmenting, or format unifying.

6. The method of claim 1, wherein the target training feature data comprises at least one selected from: a temporal feature related to the sample web data, or an attribute feature related to the target training triple data in the sample web data.

7. A non-transitory computer-readable storage medium having computer instructions therein, wherein the computer instructions are configured to cause a computer to implement the method of processing the triple data of claim 1.

8. An electronic device, comprising:

at least one processor; and a memory communicatively connected to the at least one processor, wherein the memory stores instructions executable by the at least one processor, and the instructions, when executed by the at least one processor, cause the at least one processor to implement a method of processing triple data, comprising operations of:

performing a triple data extraction on text data to obtain a plurality of field data;

normalizing the plurality of field data to determine target triple data, wherein the target triple data contains entity data, entity relationship data, and association entity data; and verifying a confidence level of the target triple data to obtain a verification result, wherein the instructions, when executed by the at least one processor, cause the at least one processor further to implement operations of:

searching for web data related to the target triple data by using the target triple data as a search term;

generating target feature data according to the web data; and inputting the target feature data into a triple data processing model, so as to obtain the verification result, wherein the triple data processing model is obtained by training, and the training comprises:

performing a triple data extraction on text training data to obtain a plurality of training field data;

normalizing the plurality of training field data to determine target training triple data, wherein the target training triple data contains training entity data, training entity relationship data, and training association entity data; and training the triple data processing model by using the target training triple data and a label for the target training triple data, so as to obtain a trained triple data processing model, wherein the label indicates a confidence level of the target training triple data, wherein the training the triple data processing model by using the target training triple data and a label for the target training triple data, so as to obtain a trained triple data processing model, comprises:

searching for sample web data related to the target training triple data by using the target training triple data as a search term; and generating target training feature data according to the sample web data, so as to train the triple data processing model by using the target training feature data and the label to obtain the trained triple data processing model.

9. The electronic device of claim 8, wherein the instructions, when executed by the at least one processor, cause the at least one processor further to implement operations of:

performing the triple data extraction on the text data to obtain a plurality of initial field data;

identifying initial field data of a target type from the plurality of initial field data;

extracting candidate data from the text data responsive to the initial field data of the target type conforming to a predetermined rule; and modifying the initial field data of the target type according to the candidate data, so as to obtain the plurality of field data.

10. The electronic device of claim 8, wherein the instructions, when executed by the at least one processor, cause the at least one processor further to implement operations of:
   clustering field data of a target type in the plurality of field data, so as to determine a cluster; and
   sorting field data in the cluster according to a number of words or a data source, and determining top field data as a target field of the target type, so as to obtain the target triple data.

11. The electronic device of claim 8, wherein the target feature data comprises at least one selected from: a temporal feature related to the web data, or an attribute feature related to the target triple data in the web data.

12. The electronic device of claim 8, wherein the instructions, when executed by the at least one processor, cause the at least one processor further to implement operation of:
   preprocessing initial text data to obtain the text data at a sentence level,
   wherein the preprocessing comprises at least one selected from: selecting, sentence segmenting, or format unifying.

13. The electronic device of claim 8, wherein the target training feature data comprises at least one selected from: a temporal feature related to the sample web data, or an attribute feature related to the target training triple data in the sample web data.

\* \* \* \* \*